(12) United States Patent
Dudley

(10) Patent No.: US 8,948,795 B2
(45) Date of Patent: Feb. 3, 2015

(54) SYSTEM AND METHOD FOR DYNAMIC SPAM DETECTION

(75) Inventor: William H. Dudley, Lovettsville, VA (US)

(73) Assignee: Sybase 365, Inc., Reston, VA (US)

( * ) Notice: Subject to any disclaimer, the term of this patent is extended or adjusted under 35 U.S.C. 154(b) by 396 days.

(21) Appl. No.: 13/466,298

(22) Filed: May 8, 2012

(65) Prior Publication Data

US 2013/0303204 A1 Nov. 14, 2013

(51) Int. Cl.
*H04W 4/00* (2009.01)

(52) U.S. Cl.
USPC .......................................................... 455/466

(58) Field of Classification Search
USPC ................................................. 711/163, 167
See application file for complete search history.

(56) References Cited

U.S. PATENT DOCUMENTS

| | | |
|---|---|---|
| 5,351,235 A | 9/1994 | Lahtinen |
| 5,371,732 A | 12/1994 | Brocken et al. |
| 5,621,727 A | 4/1997 | Vaudreuil |
| 5,768,509 A | 6/1998 | Gunluk |
| 5,887,249 A | 3/1999 | Schmid |
| 5,894,478 A | 4/1999 | Barzegar et al. |
| 6,052,458 A | 4/2000 | Amir-Ebrahimi |
| 6,208,870 B1 | 3/2001 | Lorello et al. |
| 6,230,004 B1 | 5/2001 | Hall et al. |
| 6,230,009 B1 | 5/2001 | Holmes et al. |
| 6,240,293 B1 | 5/2001 | Koster |
| 6,327,267 B1 | 12/2001 | Valentine et al. |
| 6,366,663 B1 | 4/2002 | Bauer et al. |
| 6,421,437 B1 | 7/2002 | Slutsman |
| 6,512,448 B1 | 1/2003 | Rincon et al. |
| 6,535,746 B1 | 3/2003 | Yu et al. |
| 6,560,226 B1 | 5/2003 | Torrey et al. |
| 6,594,254 B1 | 7/2003 | Kelly |
| 6,633,764 B1 | 10/2003 | Garcia |

(Continued)

FOREIGN PATENT DOCUMENTS

| | | |
|---|---|---|
| EP | 0777394 A1 | 12/1995 |
| EP | 0959600 A1 | 11/1999 |

(Continued)

OTHER PUBLICATIONS

Zdziarski, J., "Ending Spam: Bayesian Content Filtering and the Art of Statistical Language Classification", Jul. 1, 2005, No Starch Press, Inc., pp. 1-287.

(Continued)

*Primary Examiner* — Patrick Edouard
*Assistant Examiner* — Shantell L Heiber
(74) *Attorney, Agent, or Firm* — Kenyon & Kenyon LLP

(57) ABSTRACT

A flexible, extensible, and dynamically configurable anti-spam facility that operates on a general quanta of data (such as for example a Short Message Service message, a Multimedia Message Service message, an Internet Protocol Multimedia Subsystem message, a Wireless Application Protocol stream, an Electronic Mail message, an Instant Messaging exchange, streaming (audio, video, etc.) data, etc.), innovatively analyzes various attributes of same (such as for example originating address and destination address), and—when an instance of spam is identified—performs one or more remediation activities (such as for example updating a blacklist, updating a greylist, dropping a message, issuing an alert, etc.). The facility may optionally leverage the capabilities of a centrally-located Messaging Inter-Carrier Vendor.

10 Claims, 15 Drawing Sheets

(56) References Cited

U.S. PATENT DOCUMENTS

| | | |
|---|---|---|
| 6,658,260 B2 | 12/2003 | Knotts |
| 6,728,738 B2 | 4/2004 | Wolczko et al. |
| 6,738,630 B2 | 5/2004 | Ashmore |
| 6,772,267 B2 | 8/2004 | Thaler et al. |
| 6,778,941 B1 | 8/2004 | Worrell et al. |
| 6,819,932 B2 | 11/2004 | Allison et al. |
| 6,879,594 B1 | 4/2005 | Lee et al. |
| 6,885,872 B2 | 4/2005 | McCann et al. |
| 7,103,372 B1 | 9/2006 | Kupsh |
| 7,145,875 B2 | 12/2006 | Allison et al. |
| 7,171,690 B2 | 1/2007 | Kouznetsov et al. |
| 7,424,209 B2 | 9/2008 | Mazur |
| 7,523,502 B1 | 4/2009 | Kennedy et al. |
| 7,640,361 B1 | 12/2009 | Green et al. |
| 7,647,398 B1 | 1/2010 | Fan |
| 2002/0015403 A1 | 2/2002 | McConnell et al. |
| 2002/0029189 A1 | 3/2002 | Titus et al. |
| 2002/0112014 A1 | 8/2002 | Bennett et al. |
| 2002/0167909 A1 | 11/2002 | Balazinski et al. |
| 2003/0078033 A1 | 4/2003 | Sauer et al. |
| 2003/0079145 A1 | 4/2003 | Kouznetsov et al. |
| 2003/0083078 A1 | 5/2003 | Allison et al. |
| 2003/0118027 A1 | 6/2003 | Lee et al. |
| 2003/0120947 A1 | 6/2003 | Moore et al. |
| 2003/0202521 A1 | 10/2003 | Havinis et al. |
| 2004/0003276 A1 | 1/2004 | Kouznetsov et al. |
| 2004/0032856 A1 | 2/2004 | Sandstrom |
| 2004/0102201 A1 | 5/2004 | Levin |
| 2004/0187007 A1 | 9/2004 | Vincent et al. |
| 2004/0199592 A1 | 10/2004 | Gould et al. |
| 2005/0101306 A1 | 5/2005 | Zabawskyj et al. |
| 2005/0186974 A1 | 8/2005 | Cai |
| 2005/0278620 A1 | 12/2005 | Baldwin et al. |
| 2005/0283837 A1 | 12/2005 | Olivier et al. |
| 2006/0031318 A1 | 2/2006 | Gellens |
| 2006/0053203 A1 | 3/2006 | Mijatovic |
| 2006/0059238 A1 | 3/2006 | Slater et al. |
| 2006/0123479 A1 | 6/2006 | Kumar et al. |
| 2006/0272025 A1 | 11/2006 | Mononen |
| 2007/0016952 A1 | 1/2007 | Stevens |
| 2007/0083930 A1 | 4/2007 | Dumont et al. |
| 2007/0240222 A1 | 10/2007 | Tuvell et al. |
| 2007/0258437 A1 | 11/2007 | Bennett |
| 2007/0283192 A1 | 12/2007 | Shevchenko |
| 2008/0082658 A1* | 4/2008 | Hsu et al. ............... 709/224 |
| 2008/0141372 A1 | 6/2008 | Massey et al. |
| 2009/0144823 A1 | 6/2009 | Lamastra et al. |
| 2009/0254993 A1 | 10/2009 | Leone |
| 2009/0307313 A1* | 12/2009 | Wang et al. ............. 709/206 |
| 2010/0064341 A1 | 3/2010 | Aldera |
| 2010/0161734 A1* | 6/2010 | Wang ...................... 709/206 |

FOREIGN PATENT DOCUMENTS

| | | |
|---|---|---|
| WO | WO9720442 | 6/1997 |
| WO | WO9736434 | 10/1997 |
| WO | WO9911078 | 3/1999 |
| WO | WO9933226 | 7/1999 |
| WO | WO0041533 | 7/2000 |
| WO | WO0225875 A1 | 3/2002 |
| WO | WO02071234 A1 | 9/2002 |

OTHER PUBLICATIONS

Schwartz, A., "SpamAssassin", Jul. 2004, O'Reilly Media, Inc. pages 1-207.

Fienberg, S., When Did Bayesian Interference Become 'Bayesian'?, 2006, Journal of the International Society of Bayesian Analysis, vol. 1, issue 1, pp. 1-40 retrieved from http://ba.stat.cmu.edu/journal/2006/vol01/issue01/fienberg.pdf.

Wikipedia, "Scale Factor", Nov. 27, 2006, pp. 1-2, retrieved from http://en.wikipedia.org/w/index.php?title=Scale_factor&oldid=90421052.

Graham, P. Hackers & Painters, Chapter 8: "A Plan for Spam", O'Reilly Media, Inc., May 18, 2004, pp. 121-129, retrieved from httpL//academic.safaribooksonline.com/book/programming/0596006624/a-plan-for-spam/hackpaint-chp-8 on Feb. 16, 2011.

Yerazunis, W.S., "The Spam-Filtering Accuracy Plateau at 99.9 percent Accuracy and How to Get Past It", Mitsubishi Electric Research Laboratories, TR2004-091, Dec. 2004, retrieved from http://www.merl.com/reports/docs/TR2004-091.pdf on Feb. 20, 2011.

Russell et al., Artificial Intelligence: A Modern Approach Second Edition, 2003, Pearson Education, Inc., pp. 462-482.

Shreshtha et al., "Improved Bayesian Spam Filtering Based on Co-Weighted Multi-Area Information", Advances in Knowledge Discovery and Data Mining, Lecture Notes in Computer Science, 2005, vol. 3518 (2005), pp. 650-660, retrieved from http://www.springerlink.com/content/hrvh7ahe13xkdb4/on Feb. 20, 2011.

Dixit et al., "LOHIT: An Online Detection & Control System for Cellular SMS Spam," Proceedings of the IASTED International Conference on Communication, Network, and Information Security, Nov. 14-16, 2005, pp. 48-54 http://citeseerx.ist.psu.edu/viewdoc/download?doi=10.1.1.121.4739&rep=rep1&type=pdf.

Deng et al., "Research on a Naive Bayesian Based Short Message Filtering System," 2006 International Conference on Machine Learning and Cybernetics Aug. 13-16, 2006, pp. 1233-1237, retrieved from http://ieeexplore.ieee.org/stamp/stamp.jsp?tp=&arnumber=4028252&isnumber=4028022 on Jun. 30, 2011.

Hidalgo et al., "Content Based SMS Spam Filtering," Proceedings on the 2006 ACM Symposium on Document Engineering, Oct. 10-13, 2006, pp. 107-114, retrieved from http://portal.acm.org/citation.cfm?doid=1166160.1166191 on Jun. 30, 2011.

Harte, Wireless Dictionary 2005, Althos Publishing, pp. 373, 499.

Allin et al., Wireless Java for Symbian Devices, 2001, John Wiley & Sons, Ltd., pp. 1-6, 170-178, 295-297.

International Search Report and Written Opinion, PCT/US2004/003513, Dec. 10, 2004, 12 pages.

* cited by examiner

| Originating Address | Number of Unique Destination Addresses | | | |
|---|---|---|---|---|
| | Window X (Current) | Window X-1 | Window X-2 | ... |
| ... 7035551234 | 3 | 21 | 6 | ... |

FIG. 15

SYSTEM AND METHOD FOR DYNAMIC SPAM DETECTION

BACKGROUND

1. Field of the Invention

The present invention relates generally to telecommunications services. More particularly, the present invention relates to capabilities that can enhance substantially the value and usefulness of various communication paradigms including, inter alia, Short Message Service (SMS), Multimedia Message Service (MMS), Internet Protocol (IP) Multimedia Subsystem (IMS), Wireless Application Protocol (WAP), Electronic Mail (E-Mail), Instant Messaging (IM), streaming (audio, video, etc.) data, etc.

2. Background of the Invention

As the 'wireless revolution' continues to march forward (through various flavors of 2G, 3G, 4G, and beyond) the importance to a Mobile Subscriber (MS)—for example a user of a Wireless Device (WD) that is serviced in some way by possibly inter alia a Wireless Carrier (WC)—of their WD grows substantially. By way of (non-limiting) example, a WD may comprise inter alia a mobile (e.g., feature, smart, etc.) telephone; a portable computing device; a desktop, laptop, pad, handheld, etc. computer; a Personal Digital (or Data) Assistant (PDA); a home, automobile, etc. audio and/or video system; etc.

One consequence of the growing importance of WDs is the resulting ubiquitous nature of WDs—i.e., MSs carry them at almost all times and use them for an ever-increasing range of activities.

(Note: While portions of the discussion below will, for simplicity of exposition, refer to messaging generally and certain types of messaging—including inter alia SMS, MMS, etc.—specifically, it will be readily apparent to one of ordinary skill in the relevant art that application of aspects of the present invention to numerous other communication paradigms (including inter alia a Voice Over IP (VoIP) data stream, software application (e.g., game, etc.) data, a Session Initiation Protocol (SIP)-addressed artifact, a video data stream (e.g., a movie, a video conference call, etc.), a voice telephone call, an audio data stream (e.g., a song, etc.), signaling and other command-and-control data, etc.) is easily possible and may indeed be considered to be fully within the scope of the present invention.)

Over the past several years various factors (including the ubiquitous nature of WDs) have driven a steady annual increase, year over year, in among other things the number of SMS, MMS, etc. messages that have been exchanged by and between WDs. That steady increase shows no sign of abating. For example, as reported by the industry group CTIA (see ctia.org on the World Wide Web) in the U.S. there were over 2.3 trillion SMS messages sent during 2011 (up from approximately 2.0 trillion messages sent during 2010 and approximately 1.6 trillion messages sent during 2009) and there were over 53.0 billion MMS messages sent during 2011 (up from approximately 35.0 billion messages sent during 2009 and approximately 15.0 billion MMS messages sent during 2008).

As MSs have employed their WDs for ever more activities (including among other things different flavors of messaging) their WDs have become increasingly more vulnerable to a range of undesirable behaviors. One undesirable behavior is spam (e.g., unsolicited, undesired, possibly bulk-dispatched messages).

Internet-based Electronic Mail (E-mail) spam has become notorious. As has been noted by NetZero, spam " . . . is the Internet's equivalent of junk mail. The Internet abuse generally referred to as spamming ranges from annoyances like electronic mass mailings, mass advertisements, junk email, chain letters, and off-topic newsgroup postings on one hand to more serious abuses such as perpetration of scams or confidence games, transmission of fraudulent product or service promotions and harassing or threatening emails on the other. All types of spam waste the valuable time, energy and resources of the recipients, the service providers involved, and the whole Internet community."

A number of efforts or initiatives have arisen in response to the growth of Internet-based E-mail spam including, inter alia, purely technical efforts (such as, e.g., the SpamHaus project) and legal initiatives (such as, e.g., the CAN-SPAM Act of 2003 (Controlling the Assault of Non-Solicited Pornography and Marketing Act)).

Since spam artists are now targeting WDs within wireless messaging ecosystems (in fact, the term "SpaSMS" has been coined to describe SMS-based spam), a range of new, enhanced anti-spam mechanisms are necessary to efficiently, dynamically, etc. identify or detect, and optionally eliminate, spam within a wireless messaging ecosystem. Some of the approaches that have been tried, each having a different level of success, include:

1) Message body or content (e.g., keyword) analysis. Given the staggering message volumes (as described above) such an approach can consume significant computing resources and potentially add unwanted latency to message processing operations.

2) Message rate analysis by for example originating address. Such an approach can be overcome by spammers by among other things using a large pool of originating addresses, distributing their message quantity over time, etc. Such an approach is also susceptible to false positives given the legitimate, rapid message-based conversations that are frequently carried out by many MSs (such as for example teenagers).

The present invention provides a generalized infrastructure that offers, among other things, enhanced dynamic anti-spam capabilities (that can be employed alone or in combination with other anti-spam mechanisms) and addresses various of the (not insubstantial) challenges that are associated with same in new and innovatory ways.

SUMMARY OF THE INVENTION

In one embodiment of the present invention there is provided a computer-implemented method for detecting spam that includes at least (1) receiving an SMS message, (2) processing the SMS message, including (a) incrementing by one a counter in a cache entry for the originating address of the SMS message when the destination address of the SMS message is unique for the originating address within a defined period of time, (b) when a counter value exceeds a defined threshold setting a spam indicator, and (c) when the spam indicator is set performing one or more remediation activities including at least updating a blacklist.

In another embodiment of the present invention there is provided a computer-implemented method for detecting spam that includes at least (a) receiving an SMS message, (b) processing the SMS message including creating a message processing artifact, (c) incrementing by one a counter in a cache entry for the originating address of the message processing artifact when the destination address of the message processing artifact is unique for the originating address within a defined period of time, (d) accessing various of the cache entries, evaluating a value of a counter in same, and when a value exceeds a defined threshold performing one or more remediation activities including at least updating a blacklist These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the summary that was presented above and the description that may be found below, further serve to illustrate inter alia the principles, structure, and operation of such embodiments. It will be readily apparent to one of ordinary skill in the relevant art that numerous variations, modifications, alternative forms, etc. of the depicted embodiments are easily possible and indeed are within the scope of the present invention.

FIG. 15 depicts an exemplary mechanism through which aspects of the present invention may be implemented.

Figure 1:
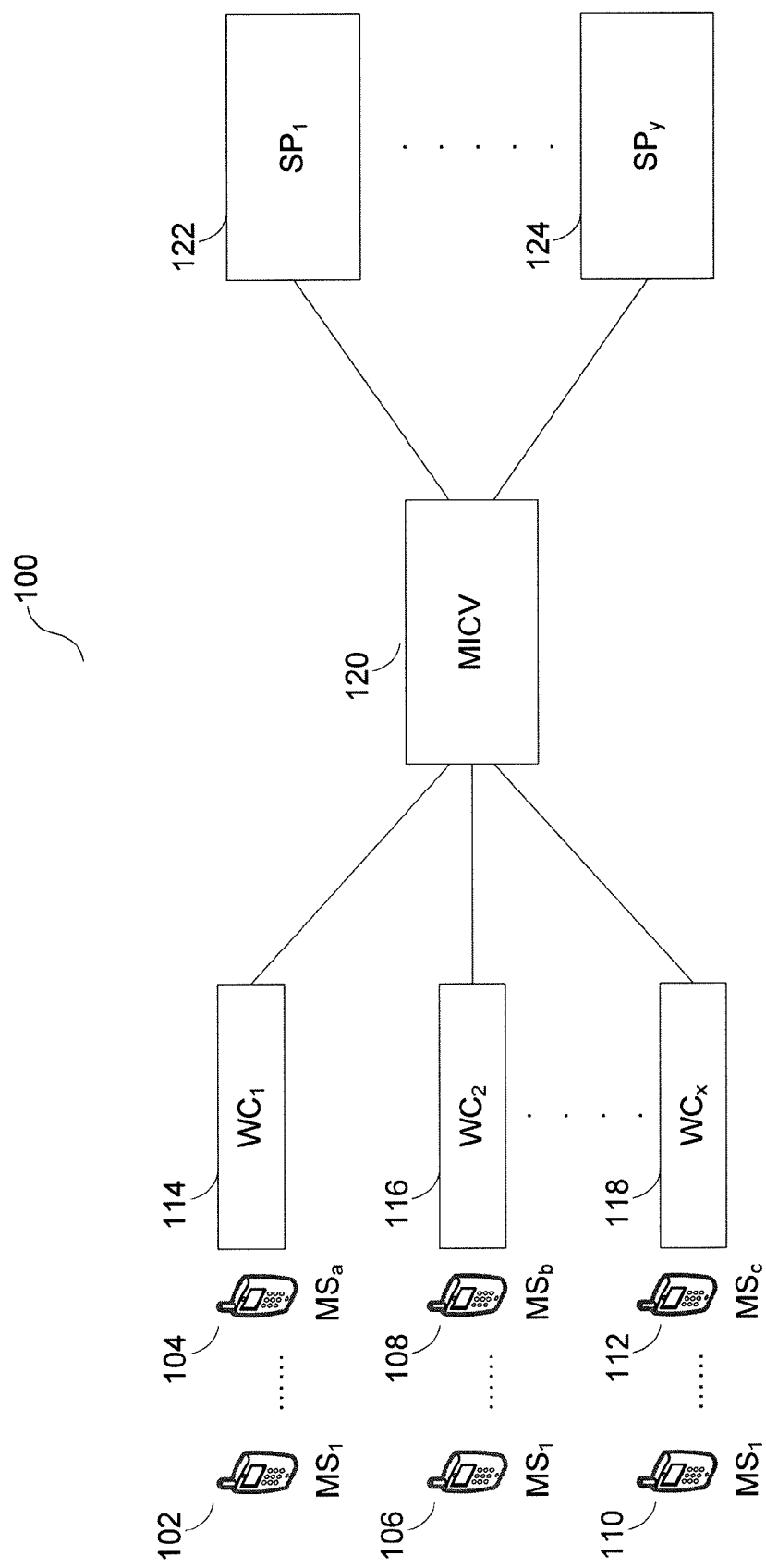
FIG. 1 is a diagrammatic presentation of an exemplary Messaging Inter-Carrier Vendor (MICV).

The present invention will now be described with reference to the accompanying drawings. In the drawings, generally, like reference numbers indicate identical or functionally similar elements. Additionally, generally, the left-most digit(s) of a reference number identifies the drawing in which the reference number first appears. For example, in FIG. 3 the reference numeral 120 would direct the reader to FIG. 1 for the first appearance of that reference numeral.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention.

Note that in this description references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

In the discussion below aspects of the present invention are described and illustrated as residing within a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a discussion of the concept of a MICV, a summary of various of the services/functions/etc. that may be performed by a MICV, and a discussion of various of the advantages that may arise from same. A MICV may, for example, be realized through any combination of, possibly inter alia, any one or more of (1) an element of a WC, an element of a landline carrier, or multiple such elements working together; (2) a Third-Party (3P) such as possibly inter alia a merchant, a Content Provider (CP, such as for example a news organization, an advertising agency, a brand, etc.), a financial institution, a Service Provider (SP, such as for example a provider of mobile services), etc.; (3) multiple 3P entities working together; (4) a service bureau; (5) a message service provider, and/or (6) other entities.

As illustrated in FIG. 1 and reference numeral 100 a MICV 120 is disposed between, possibly inter alia, multiple WCs ($WC_1$ 114, $WC_2$ 116,→$WC_x$ 118) on one side and multiple SPs ($SP_1$ 122→$SP_y$ 124) on the other side and is, in effect, a horizontally and vertically scalable 'hub' that may among other things 'bridge' all of the connected entities. A MICV 120 thus, as one simple example, may offer various routing, formatting, delivery, value-add, etc. capabilities that provide, possibly inter alia:

1) A WC $WC_1$ 114→$WC_x$ 118 (and, by extension, all of the MSs ($MS_1$ 102→$MS_a$ 104, $MS_1$ 106→$MS_b$ 108, $MS_1$ 110→$MS_c$ 112) that are serviced by the WC $WC_1$ 114→$WC_x$ 118) with ubiquitous access to a broad universe of SPs $SP_1$ 122→$SP_y$ 124, and 2) A SP $SP_1$ 122→$SP_y$ 124 with ubiquitous access to a broad universe of WCs $WC_1$ 114→$WC_x$ 118 (and, by extension, to all of the MSs ($MS_1$ 102→$MS_a$ 104, $MS_1$ 106→$MS_b$ 108, $MS_1$ 110 $MS_c$ 112) that are serviced by the WCs $WC_1$ 114→$WC_x$ 118).

Generally speaking a MICV may have varying degrees of visibility (e.g., access, etc.) to the (MS←→MS, MS←→SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion below will include a MICV, it will be readily apparent to one of ordinary skill in the relevant art that numerous other arrangements are equally applicable and indeed are fully within the scope of the present invention.

As just one example of an alternative arrangement, aspects of the present invention may be offered by a SP. A SP may, for example, be realized through any combination of, possibly inter alia, any one or more of (1) an element of a WC, an element of a landline carrier, an element of a MICV, or multiple such elements working together; (2) a 3P such as possibly inter alia a merchant, a CP (such as for example a news organization, an advertising agency, a brand, etc.), a financial institution, etc.; (3) multiple 3P entities working together; (4) a service bureau; (5) a message service provider; and/or (6) other entities.

Figure 2:
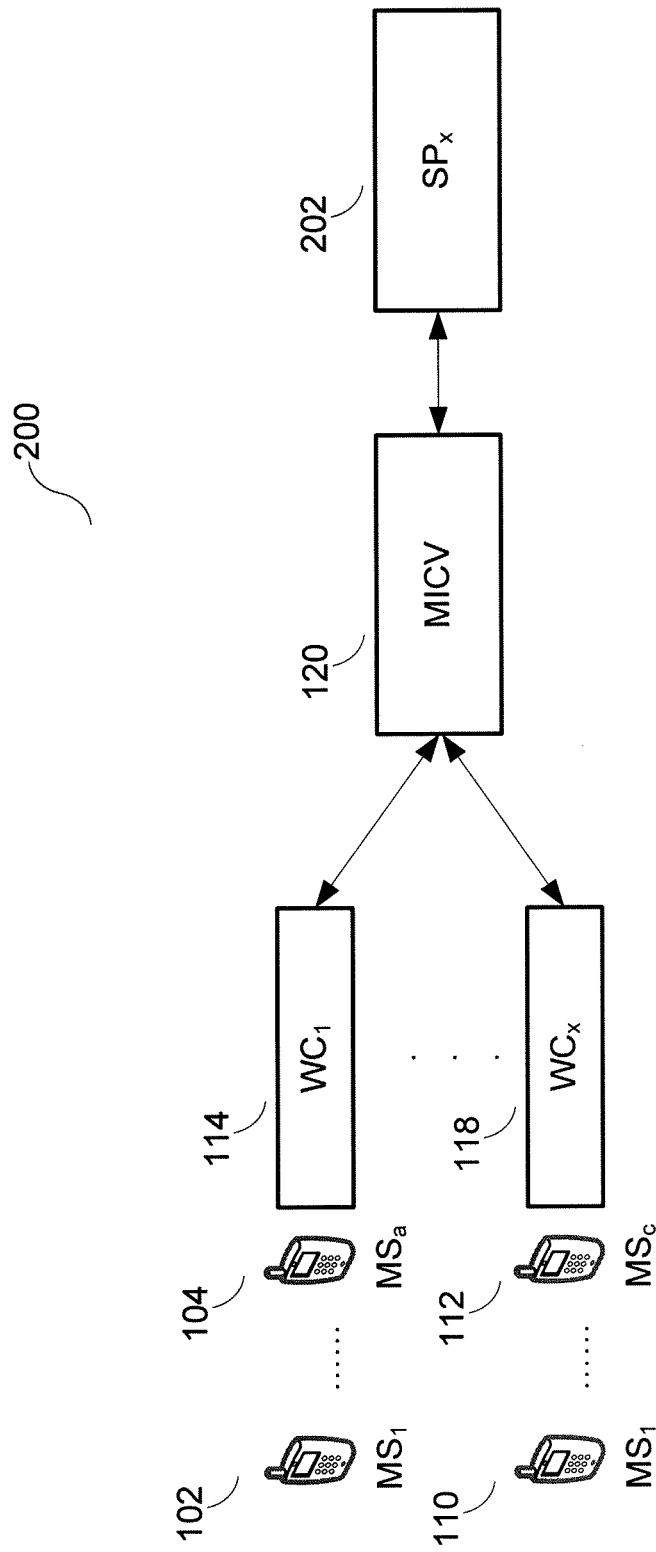
FIG. 2 illustrates one particular arrangement that is possible through aspects of the present invention.

FIG. 2 and reference numeral 200 depict one particular arrangement that may be possible under such an alternative arrangement. As the diagram portrays, the messaging traffic of numerous MSs ($MS_1$ 102→$MS_a$ 104 and $MS_1$ 110→$MS_c$ 112, including Mary) that are serviced by $WC_1$ 114→$WC_x$ 118 is exchanged with a MICV 120 and the MICV 120 is connected with $SP_x$ 202 (a SP that offers, possibly inter alia, aspects of the present invention).

While the discussion above referred to one specific alternative arrangement, it will be readily apparent to one of ordinary skill in the relevant art that numerous other alternative arrangements (including inter alia the use of multiple SPs; the sharing, blending, etc. of functionality between a MICV and one or more SPs; etc.) are equally applicable and indeed are fully within the scope of the present invention.

For variety, completeness etc. of exposition, portions of the discussion below will include a single MICV. As noted above, it will be readily apparent to one of ordinary skill in the relevant art that numerous other arrangements are easily possible (e.g., any combination of one or more of inter alia a single MICV, multiple MICVs, a single SP, multiple SPs, etc.).

In the discussion below reference is made to messages that may be sent, for example, between a MS and a MICV. As set forth below, a given 'message' sent between a MS and a MICV may actually comprise a series of steps in which the message is received, forwarded and routed between different entities, including possibly inter alia a MS, a WC, and a MICV. Thus, unless otherwise indicated, it will be understood that reference to a particular message generally includes that particular message as conveyed at any stage between an origination source, such as for example a MS, and an end receiver, such as for example a MICV. As such, reference to a particular message generally includes a series of related communications between, for example, a MS and a WC; a WC and a MICV; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

Figure 3:
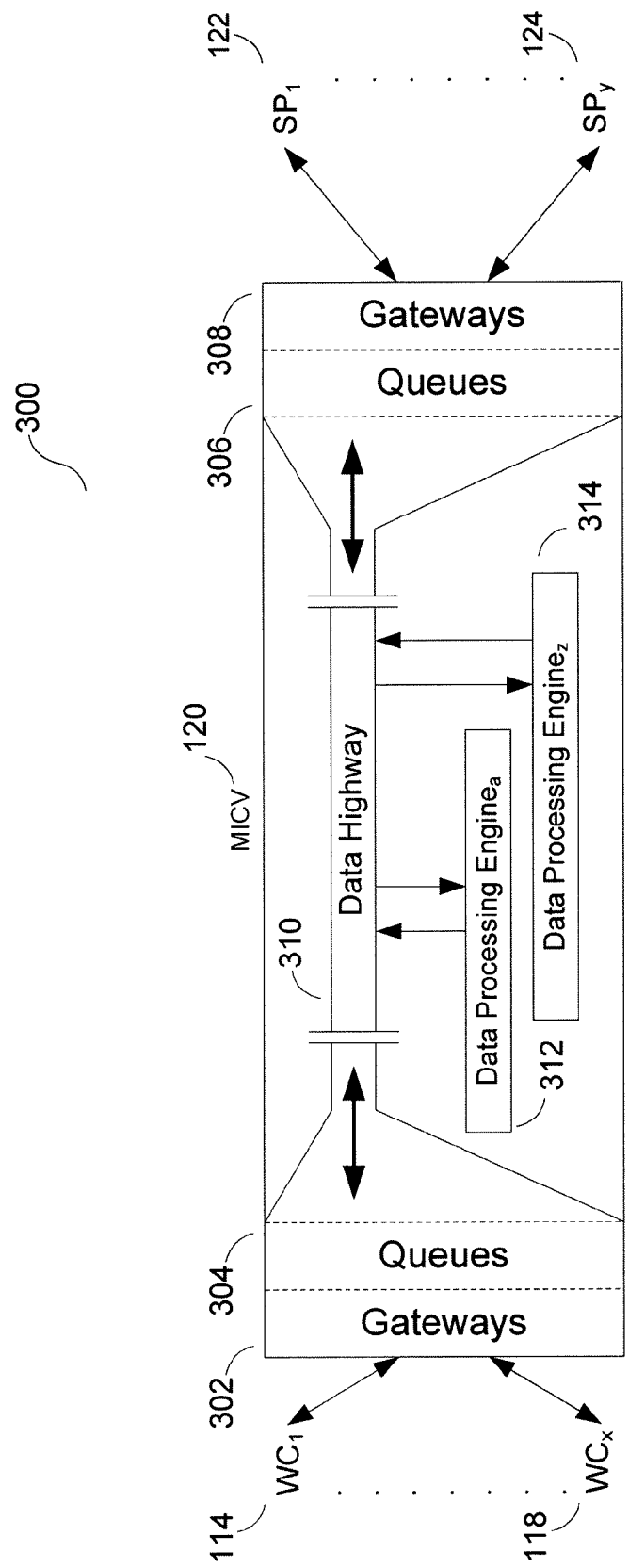
FIG. 3 illustrates various implementation aspects of an exemplary MICV.

For purposes of illustration, FIG. 3 and reference numeral 300 depict one possible logical implementation of aspects of a MICV 120 under one particular arrangement (interposed between WCs $WC_1$ 114→$WC_x$ 118 on one side and $SP_1$ 122→$SP_y$ 124 on the other side). The figure depicts among other things Gateways (302 and 308 that for example provide information/data receipt and dispatch capabilities—from/to WCs, SPs, and possibly other entities—across possibly inter alia different application-level communication protocols), Queues (304 and 306 that for example provide interim storage and buffering capabilities), a Data Highway (DH 310, that for example provides interconnection capabilities), and DPEs 312→314.

Figure 4:
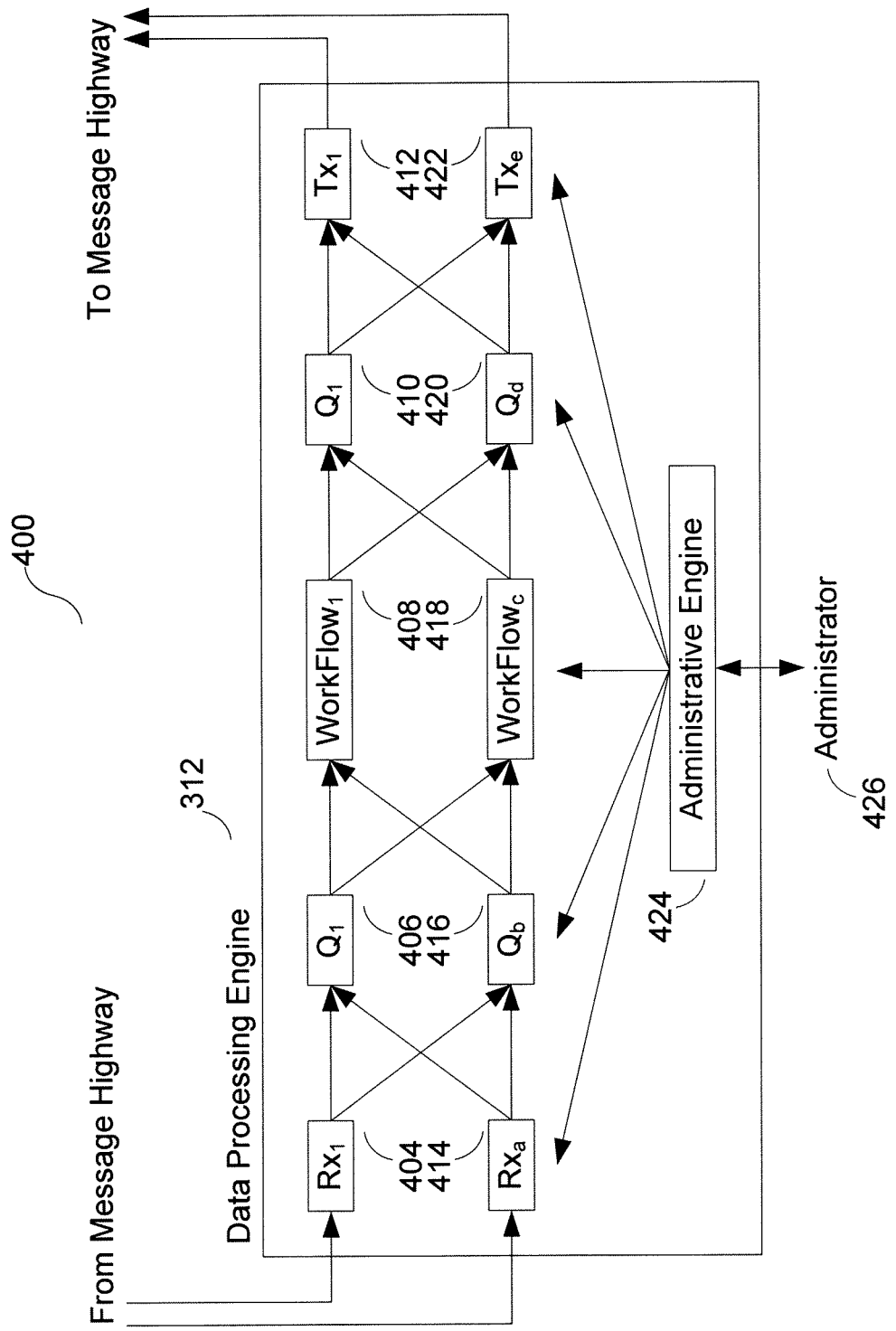
FIG. 4 illustrates various implementation aspects of an exemplary MICV Data Processing Engine (DPE).

FIG. 4 and reference numeral 400 depict a possible logical implementation of aspects of a DPE 312. A DPE may contain several key components—Receivers ($Rx_1$ 404→$Rx_a$ 414 in the diagram), Queues ($Q_1$ 406→$Q_b$ 416 and $Q_1$ 410→$Q_d$ 420 in the diagram), WorkFlows ($WorkFlow_1$ 408→$WorkFlow_c$ 418 in the diagram), Transmitters ($Tx_1$ 412→$Tx_e$ 422 in the diagram), and an Administrator 426. It will be readily apparent to one of ordinary skill in the relevant art that numerous other components, component arrangements, etc. are possible within a DPE.

A dynamically updateable set of one or more Receivers ($Rx_1$ 404→$Rx_a$ 414 in the diagram) 'get' messages from a MICV DH and deposit them on an intermediate or temporary Queue ($Q_1$ 406→$Q_b$ 416 in the diagram) for subsequent processing.

A dynamically updateable set of one or more Queues ($Q_1$ 406→$Q_b$ 416 and $Q_1$ 410→$Q_d$ 420 in the diagram) operate as intermediate or temporary buffers for incoming and outgoing messages.

A dynamically updateable set of one or more WorkFlows ($WorkFlow_1$ 408→$WorkFlow_c$ 418 in the diagram) remove incoming messages from an intermediate or temporary Queue ($Q_1$ 406→$Q_b$ 416 in the diagram), perform all of the required operations on the messages, and deposit the processed messages on an intermediate or temporary Queue ($Q_1$ 410→$Q_d$ 420 in the diagram). The WorkFlow component will be described more fully below.

A dynamically updateable set of one or more Transmitters ($Tx_1$ 412→$Tx_e$ 422 in the diagram) remove processed messages from an intermediate or temporary Queue ($Q_1$ 410→$Q_d$ 420 in the diagram) and 'put' the messages on a MICV DH.

An Administrative Engine 424 provides a linkage to all of the different components of a DPE so that a DPE, along with all of the different components of a DPE, may be fully and completely administered or managed 426.

Aspects of a MICV may 'plug into' different layers/levels/ etc. of legacy, current, and/or future technology of inter alia WCs, SPs, etc. and among other things may for example facilitate interoperation between such technologies.

For example, from a traditional messaging context an entity (such as for example a WC, a 3P such as a CP, etc.) may direct their Short Message Service Center (SMSC) complexes, their Multimedia Message Service Center (MMSC) complexes, etc. to connect to a single, simple, consolidated, etc. interface mechanism that is exposed by a MICV and subsequently seamlessly exchange message traffic.

For example, from a traditional wireless context an entity (such as for example a WC, etc.) may direct aspects of their infrastructure to connect to a single, simple, consolidated, etc. interface mechanism that is exposed by a MICV and subsequently seamlessly exchange SS7-based and/or IP-based signaling data, General Packet Radio Service (GPRS) Roaming Exchange (GRX) data, location and presence data, etc.

Central to the operation of a MICV is the unit of information within a MICV that is received, manipulated or otherwise operated on, dispatched, etc. Unlike prior environments that might operate just on, and thus potentially be limited just to, an SMS message or a MMS message, the unit of information within a MICV is a more general quanta of data. Accordingly a MICV is natively capable of operating on inter alia an SMS message, a MMS message, an IMS message, an E-Mail message, a VoIP data stream, a video data stream (e.g., a movie, a video conference call, etc.), a voice telephone call, signaling and other command-and-control data, an audio data stream (e.g., a song, etc.), IM data, games and other software applications, pictures and other static images, data from software applications such as games, etc.

Figure 5:
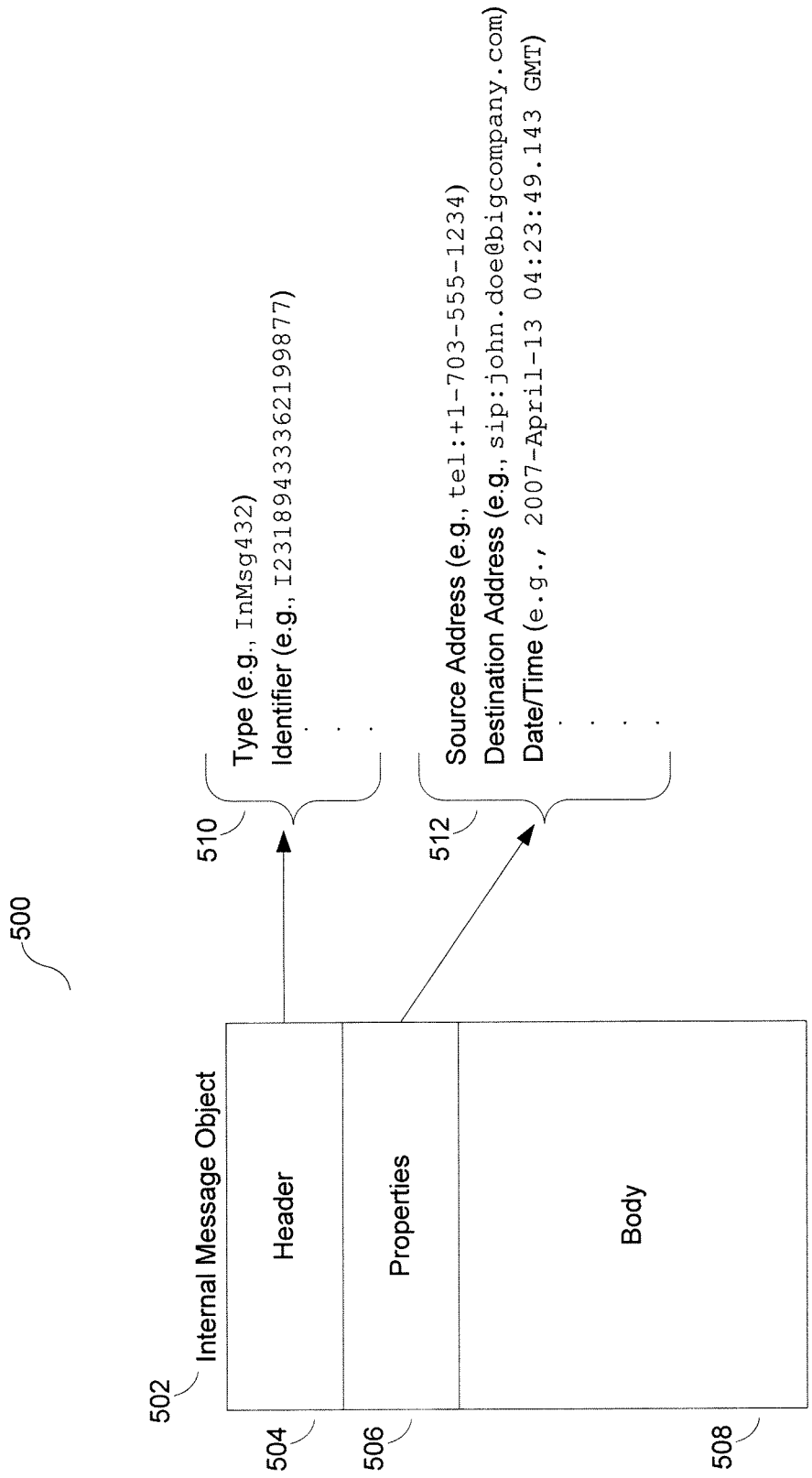
FIG. 5 illustrates aspects of an exemplary Internal Message Object (IMO).
Figure 6:
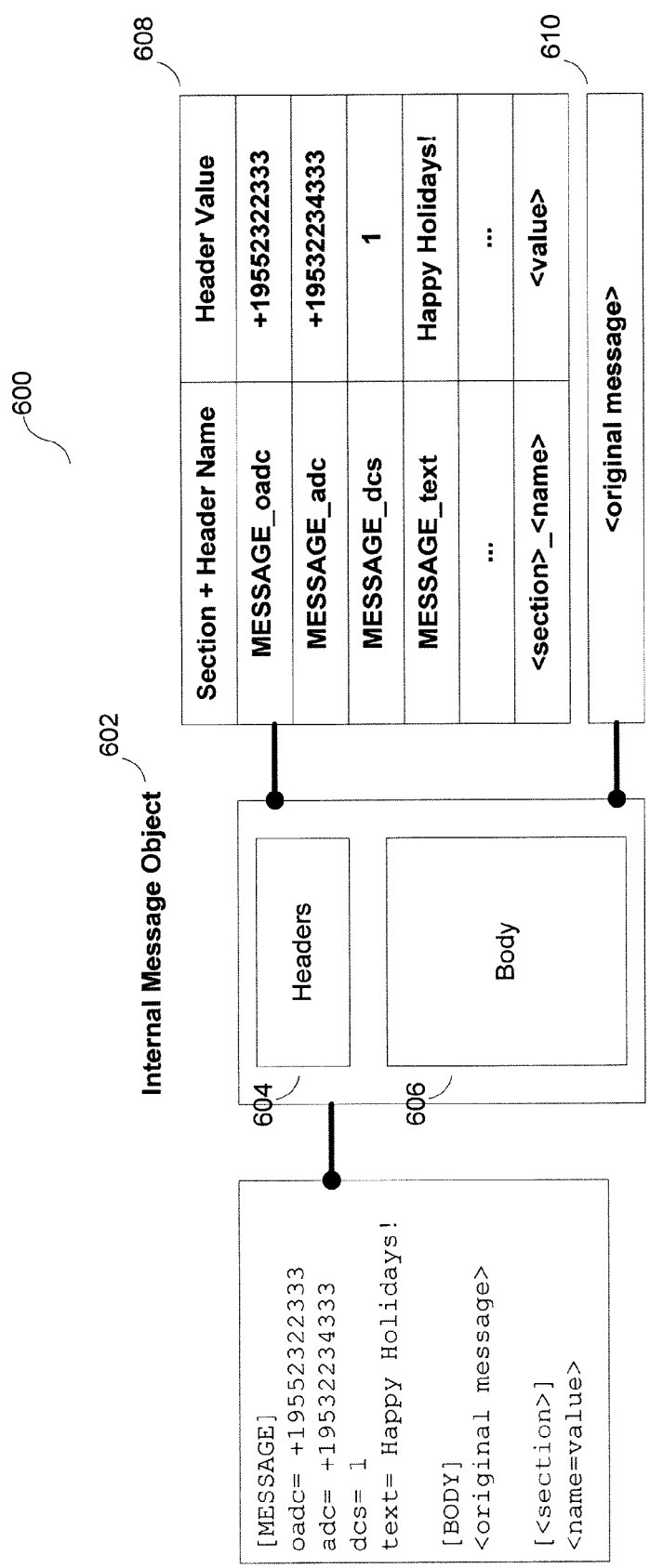
FIG. 6 illustrates aspects of an exemplary IMO.

Within a MICV a flexible, extensible, and dynamically configurable IMO (see for example FIG. 5 and reference numeral 500 and FIG. 6 and reference numeral 600) may be employed as an internal representation of aspects of a received quanta of data. An IMO (502 and 602) may logically contain possibly inter alia one or more headers (504 and 604), properties (506), a body (508 and 606), etc. within which for example aspects of a received quanta of data may be preserved (510→512 and 608→610). An IMO may physically be realized through any combination of possibly inter alia proprietary data structures, Java Message Service (JMS) messages or objects, flat files, database entries, in-memory constructs, etc.

Figure 7:
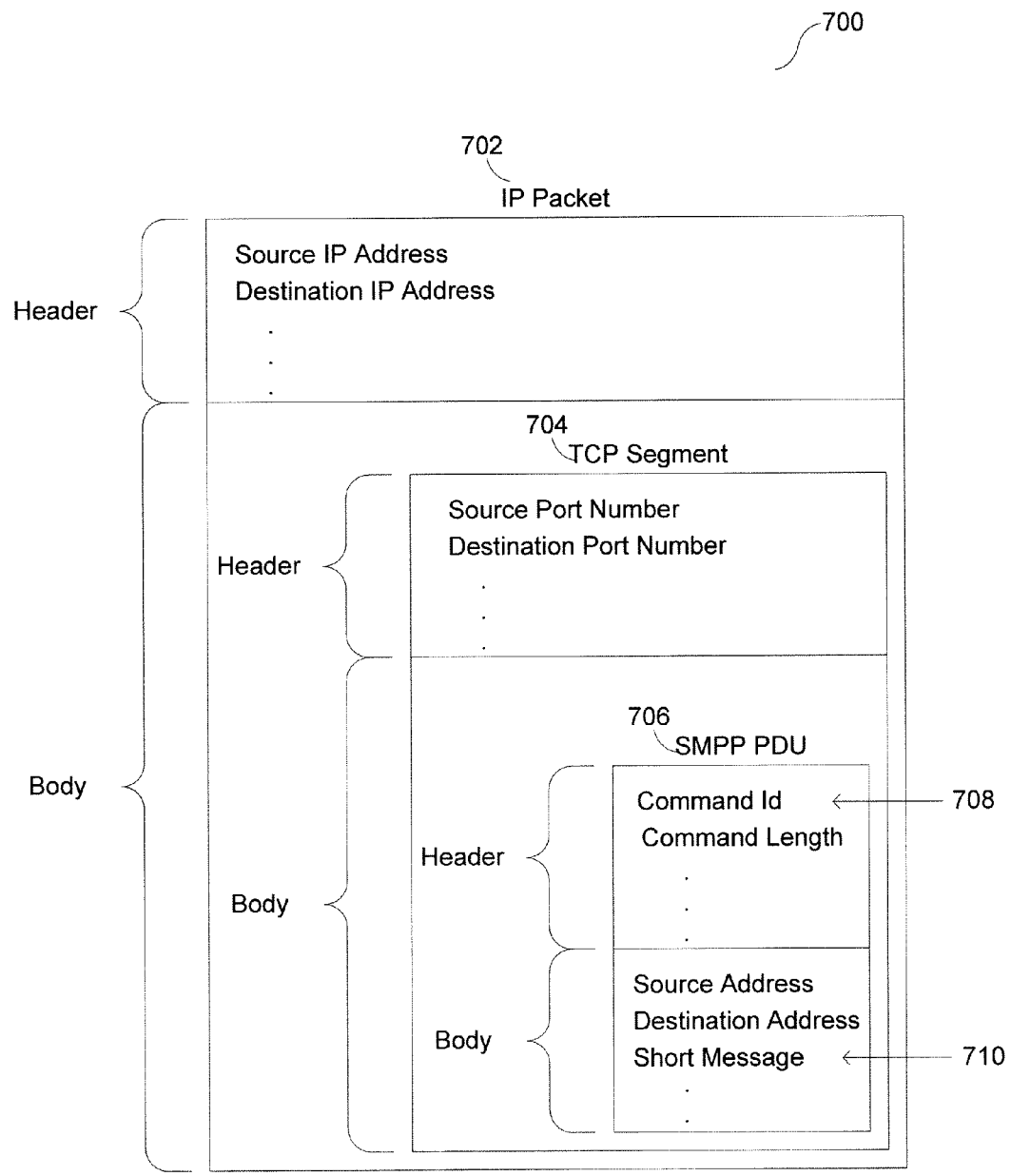
FIG. 7 illustrates aspects of an exemplary incoming SMS message received via an IP-based protocol.

For purposes of illustration, within an SMS context a MICV may support the receipt and dispatch of information through possibly inter alia Short Message Peer-to-Peer (SMPP) via Transmission Control Protocol (TCP)/IP and Mobile Application Part (MAP) via SS7. Under such a context:

1) FIG. 7 and reference numeral 700 depict an exemplary incoming SMS message received via for example SMPP with for example the data elements associated with the SMS message 708→710 encapsulated within a SMPP Protocol Data Unit (PDU) 706 encapsulated within a TCP Segment 704 encapsulated within an IP Packet 702.

Figure 8:
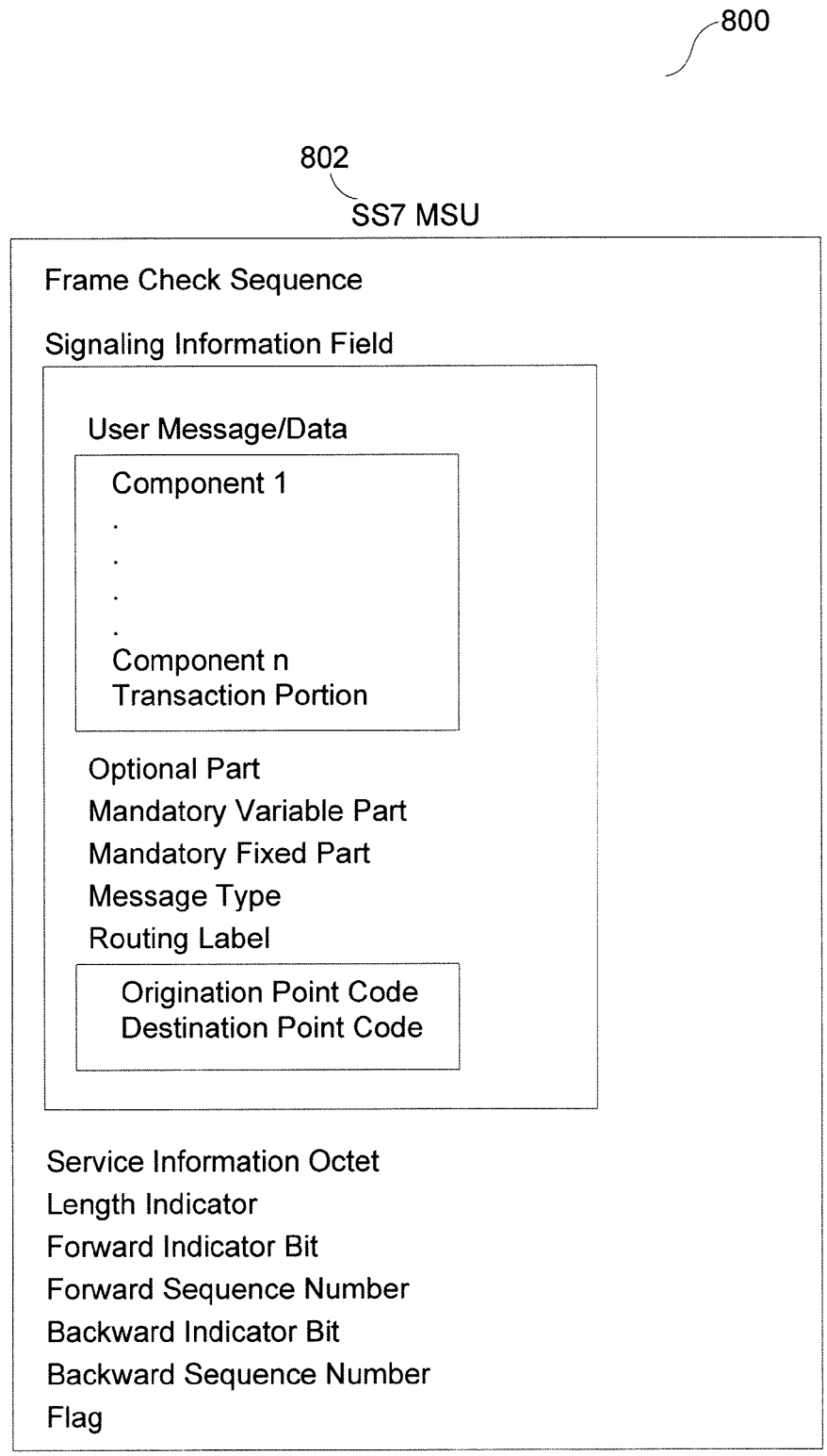
FIG. 8 illustrates aspects of an exemplary incoming SMS message received via Signaling System Number 7 (SS7).

2) FIG. 8 and reference numeral 800 depict an exemplary incoming SMS message received via for example MAP with for example the data elements associated with the SMS message encapsulated within a Message Signal Unit (MSU) 802.

Figure 9:
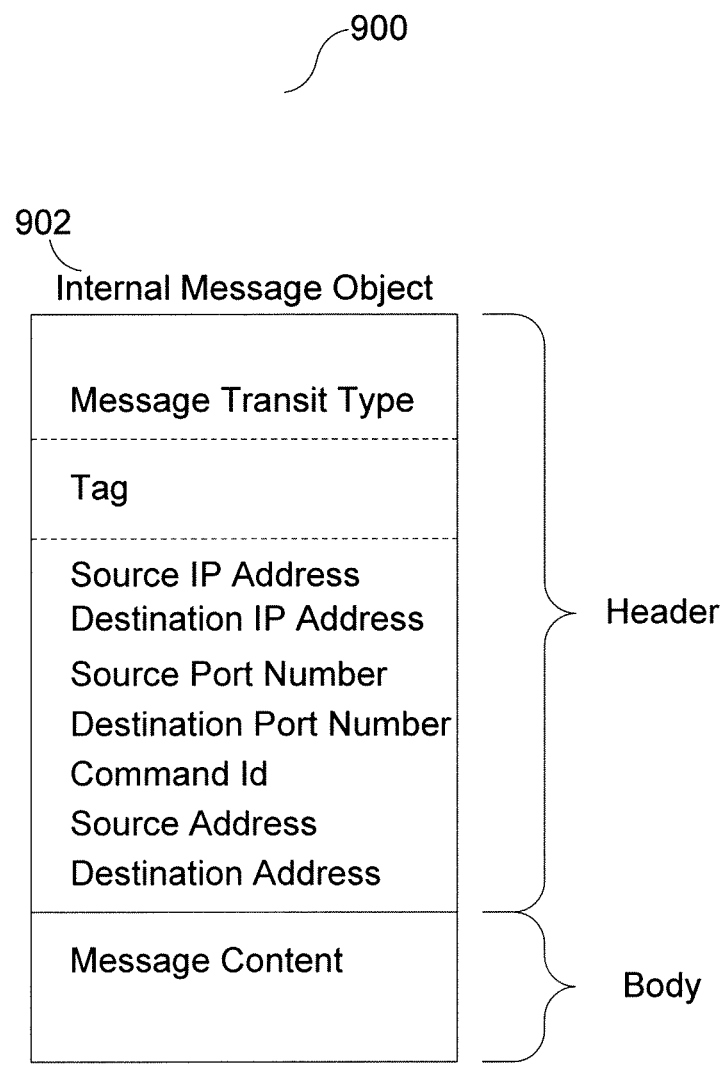
FIG. 9 illustrates aspects of a hypothetical IMO that is possible in connection with an SMS message received via an IP-based protocol.
Figure 10:
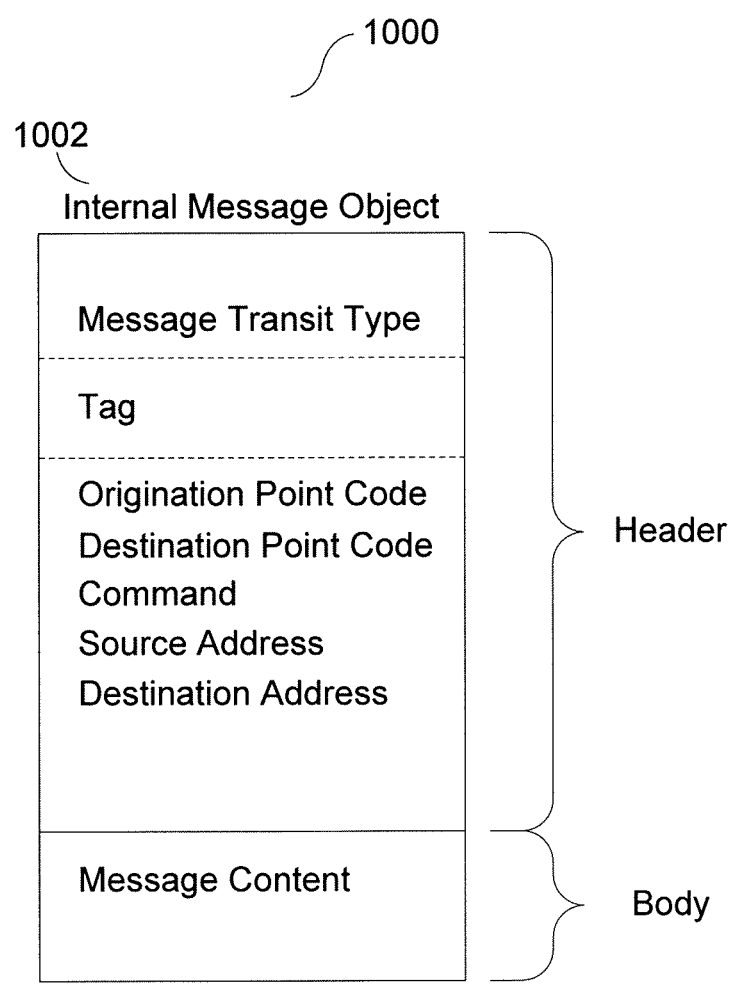
FIG. 10 illustrates aspects of a hypothetical IMO that is possible in connection with an SMS message received via SS7.

3) FIG. 9 and reference numeral 900 depict a hypothetical IMO 902 that is possible in support of an SMS message received via for example SMPP, and 4) FIG. 10 and reference numeral 1000 depict a hypothetical IMO 1002 that is possible in support of an SMS message received via for example MAP.

The artifacts that are depicted by FIGS. 7→10 are illustrative only and it will be readily apparent to one of ordinary skill in the art that among other things numerous alternative IMO arrangements—in connection with for example different contexts (such as inter alia MMS, VoIP, a voice call, signaling data, command-and-control data, software application data, etc.), different communication protocols, etc.—are easily possible. For example, information on the identity, location, capabilities, etc. of an originating party and/or a destination party may be captured, preserved, etc. in any number of ways.

As noted above, a WorkFlow component (see for example WorkFlow$_1$ 408→WorkFlow$_c$ 418 in FIG. 4) may perform a range of processing operations on inter alia a message.

Among other things a WorkFlow component may leverage a comprehensive, flexible, scalable, etc. address resolution facility to support, possibly inter alia, its routing operations. Such a facility may provide authoritative answers to inquiries like "At this moment in time what carrier services the Telephone Number (TN) 1-703-555-1212?", "What entity services the SIP addresss sip: john.doe@bigcompany.com?", etc. Among other things such a facility may address (1) the complexities that are associated with all of the different TN numbering plans, schemes, etc. that exist around the world; (2) the complexities that arise with worldwide Mobile Number Portability (MNP) regimes; etc.

Figure 11:
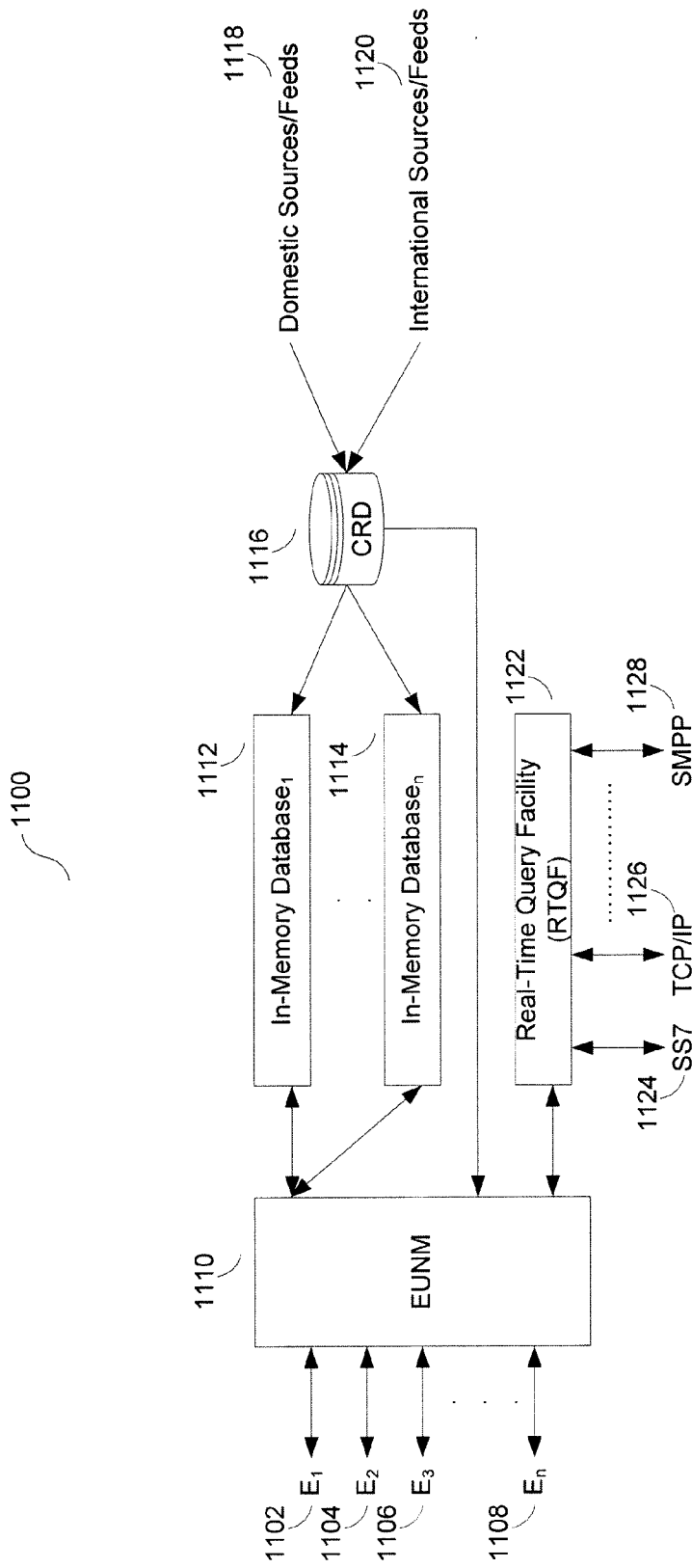
FIG. 11 illustrates aspects of an exemplary address resolution facility.

A depiction of an illustrative address resolution facility is presented in FIG. 11 and reference numeral 1100. Such a facility may consist of, possibly inter alia:

A) An Electronic Numbering (ENUM) façade 1110 through which possibly inter alia various elements of a WorkFlow component ($E_1$ 1102, $E_2$ 1104, $E_3$ 1106,→$E_n$ 1108 in FIG. 11) may connect, submit routing inquiries, receive routing responses, etc.

B) A dynamically updateable set of one or more In-Memory Databases (In-Memory Database$_1$ 1112→In-Memory Database$_n$ 1114 in the diagram) that optionally house or host selected data (including, possibly inter alia, data from a Composite Routing Database (CRD) 1116) to provide, as one example, optimal performance.

C) A Real-Time Query Facility (RTQF) 1122 through which inquiries may be dispatched real-time to authoritative bodies (such as, for example, TN assignment administrators) around the world. A RTQF 1122 may support multiple communication channels, paradigms, protocols, etc. (such as, possibly inter alia, SS7 1124, TCP/IP 1126, User Datagram Protocol (UDP)/IP, SMPP 1128, etc.).

D) A CRD 1116 containing comprehensive routing information for, possibly inter alia, TNs within all of the different TN numbering plans, schemes, etc. that exist around the world. A CRD 1116 may receive updates (e.g., dynamically, on a scheduled basis, etc.) from any number of sources or feeds including, possibly inter alia, domestic 1118 (such as, for example, from a Local Exchange Routing Guide (LERG), from one or more Number Portability Administration Centers (NPACs), etc.) and international 1120 (such as, for example, from Hong Kong, from the United Kingdom, etc.).

An address resolution facility as described above may support a wide range of address types including among others a TN (such as 703-555-1234), a Short Code (SC, such as 46625), a SIP Uniform Resource Identifier (URI, such as sip:mark@mydomain.com), a Tel URI (such as tel:+19257652333), a Uniform Resource Locator (URL), etc.

Figure 12:
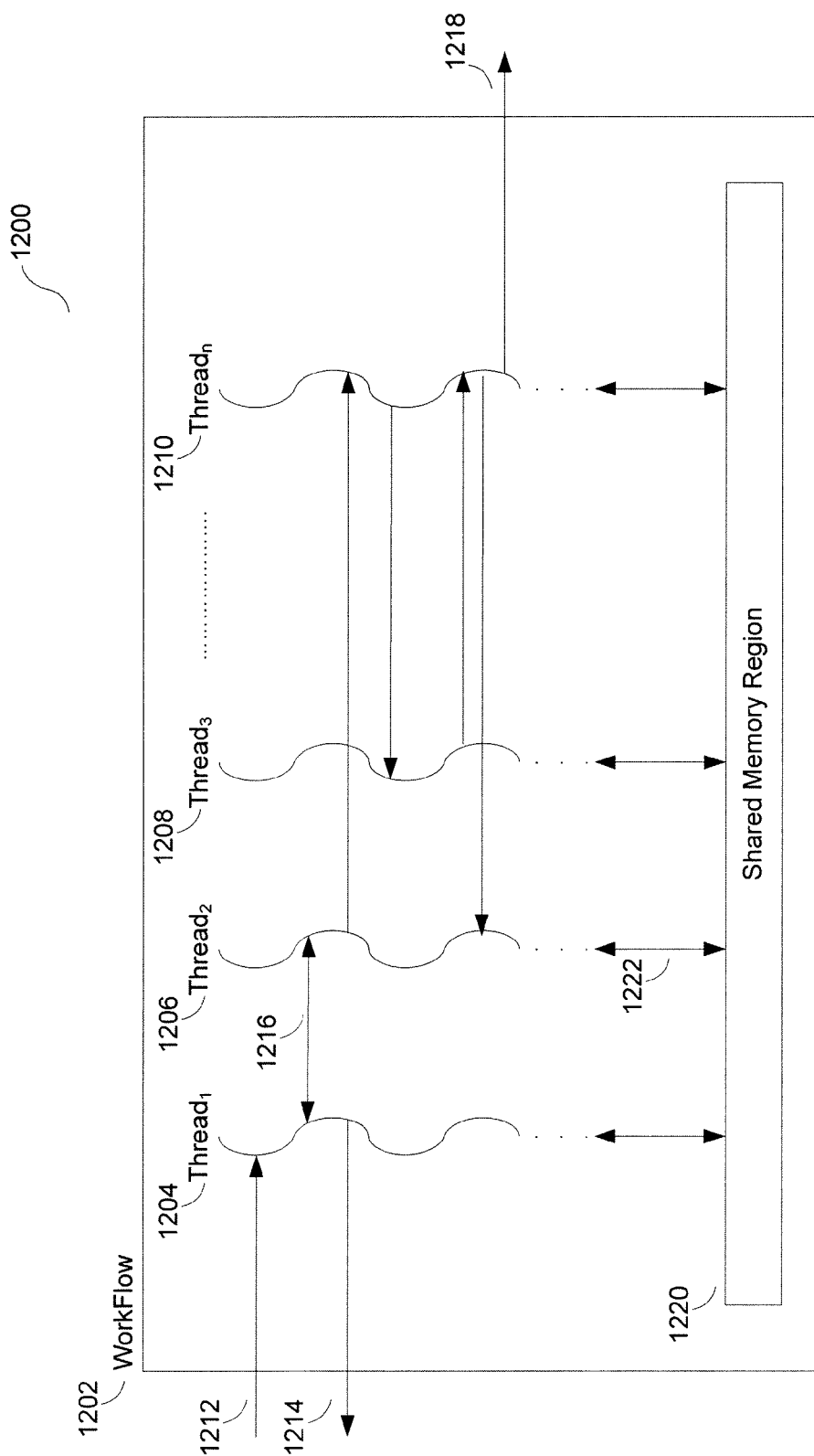
FIG. 12 depicts aspects of a hypothetical WorkFlow implementation that is possible under aspects of the present invention.

A WorkFlow component may be implemented or realized in any number of ways. For example, FIG. 12 and reference numeral 1200 depict aspects of a hypothetical implementation of a WorkFlow environment 1202 wherein possibly inter alia:

1) A dynamically adjustable number of threads (Thread$_1$ 1204, Thread$_2$ 1206, Thread$_3$ 1208,→Thread$_n$ 1210) may be inter alia created, started, allowed to operate or execute, quiesced, stopped, destroyed, etc. under control of for example the WorkFlow environment 1202. Among other things one or more threads may for example realize aspects of one or more elements of a MICV (such as for example routing operations, protocol conversion operations, message transmission operations, anti-spam operations, etc.) and/or a single thread may for example realize aspects of one or more elements of a MICV (such as for example routing operations, protocol conversion operations, message transmission operations, anti-spam operations, etc.).

2) Different elements of a MICV (such as for example routing operations, protocol conversion operations, message transmission operations, anti-spam operations, etc.) may communicate, interact, etc. with various of the threads (Thread$_1$ 1204→Thread$_n$ 1210) (see for example 1212, 1214, and 1218).

3) Various of the threads (Thread$_1$ 1204→Thread$_n$ 1210) may among themselves communicate, interact, etc. (see for example 1216).

4) Various of the threads (Thread$_1$ 1204→Thread$_n$ 1210) may communicate, interact, etc. with inter alia a Shared Memory Region (1220) (see for example 1222).

A WorkFlow component may support, enable, realize, etc. various of the anti-spam capabilities as offered by aspects of the present invention. To help illustrate this, FIG. 13 and reference numeral 1300 depict various of the exchanges that might take place during the delivery of an SMS message. As noted above:

1) While portions of the present discussion do, for simplicity of exposition, refer to messaging generally and certain types of messaging—including inter alia SMS, MMS, etc.—specifically, it will be readily apparent to one of ordinary skill in the relevant art that application of aspects of the present invention to numerous other communication paradigms (including inter alia a VoIP data stream, software application (e.g., game, etc.) data, a SIP-addressed artifact, a video data stream (e.g., a movie, a video conference call, etc.), a voice telephone call, an audio data stream (e.g., a song, etc.), signaling and other command-and-control data, etc.) is easily possible and may indeed be considered to be fully within the scope of the present invention.

2) For variety, completeness etc. of exposition, the discussion below will include a single MICV. It will be readily apparent to one of ordinary skill in the relevant art that numerous other arrangements are easily possible (e.g., as just one possibility, zero, one, or more MICVs).

Broadly speaking, and as will be explained in detail below, aspects of the present invention innovatively analyze various attributes of an SMS message (such as for example the message's originating address, destination address, content or body, receipt date and time, etc.) as the message passes through an element of a messaging ecosystem (such as for example a MICV) and, if the message is identified as being spam, then possibly inter alia trigger one or more remediation activities (such as for example any combination of one or more of possibly inter alia updating a blacklist, updating a greylist, dropping a message, issuing an alert, etc.) against, possibly among others, the originator(s) of the message.

Figure 13:
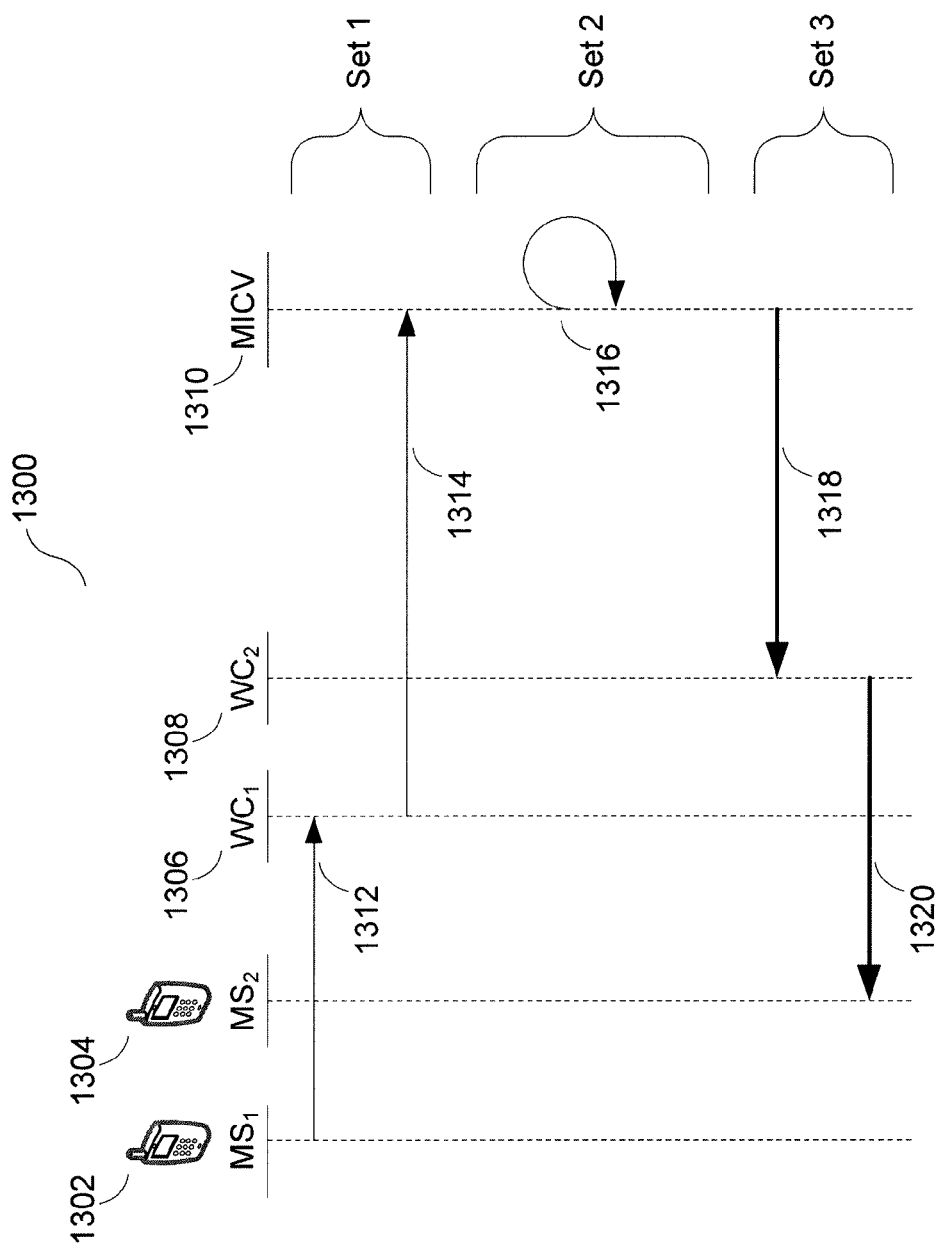
FIG. 13 illustrates various of the exchanges that are possible under aspects of the present invention.

Of interest and note in FIG. 13 are the following entities:

$MS_1$ 1302. Mary, a hypothetical MS whose WD (such as a mobile telephone, a BlackBerry, a PalmPilot, a portable computing device, etc.) has the TN 703-555-1234 and is possibly inter alia serviced by $WC_1$ 1306.

$MS_2$ 1304. Joe, a hypothetical MS whose WD (such as a mobile telephone, a BlackBerry, a PalmPilot, a portable computing device, etc.) has the TN 301-555-9876 is possibly inter alia serviced by $WC_2$ 1308.

$WC_1$ 1306. The provider of service for the WD of Mary 1302.

$WC_2$ 1308. The provider of service for the WD of Joe 1304.

MICV 1310. As noted above the use of a MICV, although not required, provides significant advantages.

For simplicity FIG. 13 captures various of the exchanges that might take place during the delivery of an SMS message from Mary ($MS_1$ 1302) to Joe ($MS_2$ 1304). It will be understood that a reply by Joe ($MS_2$ 1304) to the received SMS message would encompass, possibly among other things, an equivalent set of exchanges (traveling from Joe ($MS_2$ 1304) to Mary ($MS_1$ 1302)).

In FIG. 13 the exchanges that are captured under the designation Set 1 represent various of the activities that might take place as Mary ($MS_1$ 1302) dispatches an SMS message for delivery to Joe ($MS_2$ 1304). For example (and using a simplified, stylized notation):

| From: | 703-555-1234 |
|---|---|
| To: | 301-555-9876 |
| Body: | How about lunch? |

As illustrated in the diagram, the message travels from Mary ($MS_1$ 1302) to $WC_1$ 1306 (see 1312) and then on to MICV 1310 (see 1314) for, possibly inter alia, processing, analysis, routing, etc. (through, possibly among other things, one or more WorkFlow components).

The Set 1 exchanges that were described above are illustrative only and it will be readily apparent to one of ordinary skill in the relevant art that numerous other exchanges, exchange sequences, activities, etc. are easily possible and indeed are fully within the scope of the present invention. For example and inter alia, any of the indicated exchanges (such as 1312 and 1314) may each be repeated any number of times.

In FIG. 13 the exchanges that are captured under the designation Set 2 represent various of the (e.g., possibly WorkFlow-based) activities that might take place as MICV 1306 completes inter alia a number of processing, routing, analysis, etc. operations (see 1316) including for example a range of anti-spam actions.

Turning for a moment to FIG. 15 and reference numeral 1500, illustrated are elements of one particular implementation approach for aspects of the present invention. For each SMS message that is processed, examined, etc. (by for example a MICV), possibly inter alia the originating address of the message (such as for example the TN of the WD that originated the message, such as 703-555-1234) may be preserved (see 1502) and, for same, a count of the number of unique observed destination addresses (such as for example the TN of the WD to which the message is intended, such as 301-555-9876) may be preserved (see 1504).

The counts that were described above may be maintained, possibly inter alia, in a plurality of windows (see 1506, 1508, and 1510) where each window may, possibly inter alia, represent a different period of time. For example, window 1506 may capture counts (of the number of unique observed destination addresses) for a current time period, window 1508 may capture counts (of the number of unique observed destination addresses) for a time period that is previous to the time period of window 1506, window 1510 may capture counts (of the number of unique observed destination addresses) for a time period that is previous to the time period of window 1508, etc. The approach just described is illustrative only and it will be readily apparent that numerous alternative window arrangements are easily possible.

Any combination of (1) attributes of a message itself and/or (2) attributes of an artifact of message processing (such as for example a Message Detail Record (MDR), a Call Detail Record (CDR), etc.) may contribute to the information that is illustrated in FIG. 15. Possible attributes may include, inter alia, a message's originating address (such as for example the TN of the WD that originated the message), a message's destination address (such as for example the TN of the WD to which the message is intended), the length of a message's content or body, the actual content or body of a message, the date and time that a message was received, an identifier of the messaging ecosystem entity from which a message was received, etc.

The information that is illustrated in FIG. 15, along with possibly inter alia other information, may be preserved as, possibly among other things, a cache, Such a cache may offer, possibly inter alia, rapid access.

When a cache entry is accessed, created, etc. the value of one or more of the entry's window counts may be analyzed, examined, etc. and, possibly inter alia, compared to one or more thresholds. Alternatively, one or more of the entries in a cache may be swept, scanned, etc. (e.g., on a scheduled basis, on an as-needed or as-required basis, randomly, etc.) and for each entry encountered the value of one or more of the entry's window counts may be analyzed, examined, etc. and, possibly inter alia, compared to one or more thresholds.

When a threshold is approached, reached, exceeded, etc. one or more actions (such as for example any combination of one or more of updating a blacklist, updating a greylist, dropping a message, issuing an alert, etc.) may be performed.

For purposes of illustration, using the hypothetical SMS message from Mary to Joe that was presented above:

| From: | 703-555-1234 |
| To: | 301-555-9876 |
| Body: | How about lunch? | an entry for the originating address 703-555-1234 may be found, created, etc. in the cache (see reference numeral 1512 in FIG. 15) and possibly inter alia the entry's count (of the number of unique observed destination addresses) under the current window (see 1514) may be updated (e.g., incremented) as appropriate and as required based on the instant destination address 301-555-9876 (through, as just one example, a store of, possibly inter alia, originating address-destination address pairs). Among other things the entry's previous counts (of the number of unique observed destination addresses) may be found under other windows—1516, 1518, etc.

When the cache entry for the originating address 703-555-1234 is accessed, created, etc. and/or encountered during a sweep, scan, etc. the value of one or more of the entry's window counts (such as 3 (see 1514), 21 (see 1516), and 6 (see 1518)) may be analyzed, examined, etc. and, possibly inter alia, compared to one or more thresholds, and should a threshold be approached, reached, exceeded, etc. one or more actions (such as for example any combination of one or more of updating a blacklist, updating a greylist, dropping a message, issuing an alert, etc.) may be performed.

Returning now to FIG. 13, the Set 2 exchanges that were described above are illustrative only and it will be readily apparent to one of ordinary skill in the relevant art that numerous other exchanges, exchange sequences, activities, etc. are easily possible and indeed are fully within the scope of the present invention. For example and inter alia, MICV 1310 may optionally dispatch one or more positive, negative, etc. acknowledgements, notifications, etc. during and/or based on inter alia various of its processing, analysis, etc. activities.

In FIG. 13 the exchanges that are captured under the designation Set 3 represent various of the activities that might take place as MICV 1310 dispatches one or more outbound artifacts including, possibly inter alia, an SMS message for delivery to Joe (MS$_2$ 1304).

As illustrated in the diagram, a message travels from MICV 1310 to WC$_2$ 1308 (see 1318) and then on to Joe (MS$_2$ 1304) (see 1320).

The Set 3 exchanges that were described above are illustrative only and it will be readily apparent to one of ordinary skill in the relevant art that numerous other exchanges, exchange sequences, activities, etc. are easily possible and indeed are fully within the scope of the present invention. For example and inter alia, any of the indicated exchanges (such as 1318 and 1320) may each be repeated any number of times.

As noted above, it will be understood that a reply by Joe (MS$_2$ 1304) to a received SMS message will encompass, possibly inter alia, an equivalent set of exchanges (traveling from Joe (MS$_2$ 1304) to Mary (MS$_1$ 1302)).

The Set 1→Set 3 exchanges that were described above are illustrative only and it will be readily apparent to one of ordinary skill in the relevant art that numerous other exchanges, exchange sequences, activities, etc. are easily possible and indeed are fully within the scope of the present invention. For example and inter alia:

1) Various of the depicted exchanges may be repeated—(a) in the illustrated form or in an alternate form and (b) in any combination—any number of times as possibly inter alia Mary (MS$_1$ 1302) and Joe (MS$_2$ 1304) carry on for example a message-based conversation.

2) A cache as described above may be implemented through any number of means including inter alia memory (e.g., raw and/or structured), disk or other storage medium (e.g., raw and/or structured), etc. and may leverage among other things conventional Relational Database Management Systems (RDBMSs), Object Database Management Systems (ODBMSs), in-memory Database Management Systems (DBMSs), or any other equivalent facilities.

3) Access to a cache as described above may encompass an Application Programming Interface (API), direct memory read and write operations, wrapper functions, etc. any of which may employ inter alia security, control, etc. mechanisms.

4) Retrieval of information from a cache as describe above may encompass any combination of one or more of iteration through the contents of the cache, hash functions, algorithmic search capabilities, etc.

5) An entry in a cache as described above may contain a range of values including inter alia identifying values (such as for example a TN, an International Mobile Subscriber Identity (IMSI) value, a Mobile Switching Center (MSC) value, etc.), timestamps (e.g., for when created, for when last updated, etc.), location information (such as for example information on the current physical location of a MS' WD, an indicator as to whether the MS' WD is on its home network or if it is roaming, etc.), counters (e.g., tracking access to, or usage of, an entry), etc.

6) Management of a cache as described above may encompass among other things garbage collection (e.g., periodic 'sweeps' through the contents of the cache to recover entries, space, etc.), aging of the contents of the cache (e.g., removing, refreshing, altering, etc. various entries of the cache based on different criteria (such as for example date, time, usage frequency, etc.)), periodic integrity checks, etc. Among other things, if a cache entry identifies a MS' WD as roaming then that cache entry's management particulars (including inter alia expiration time, refresh rate, etc.) may be appropriately modified.

7) A cache as described above may be initially, periodically, etc. 'seeded' with certain (predefined, dynamically constructed, etc.) real, sentinel, etc. entries.

8) A cache as described above may optionally contain any number of other supportive, etc. data items such as inter alia configuration or control information, historical information (that may for example track the changes over time to among other things a cache entry and/or values in a cache entry), etc.

9) The contents of a cache as described above may optionally be augmented (e.g., dynamically, on a scheduled basis, etc.) with information from any number of internal and/or external sources, data feeds, etc.

10) The size of any window (such as for example 1506, 1508, and 1510 in FIG. 15) may for example be any combination of one or more of infinite, fixed (such as, e.g., 1 week, 1 day, 1 hour, 30 minutes, 15 minutes, 1 minute, etc.), variable, etc.

11) The contents of any window (such as for example 1506, 1508, and 1510 in FIG. 15) may for example be scanned, examined, analyzed, etc. on a scheduled basis, on an as-needed basis, on a random basis, on an algorithmic basis, etc. and, possibly inter alia, compared to one or more dynamically configurable thresholds.

12) When a threshold is approached, reached, exceeded, etc. inter alia one or more actions (such as for example any combination of one or more of updating a blacklist, updating a greylist, dropping a message, issuing an alert, updating a log, etc.) may be performed.

13) A cache as described above, and all of the different actions, activities, etc. that were described above against the cache, may be implemented, realized, etc. through inter alia one or more WorkFlow components.

The different activities that were described above may operate (1) directly against a (e.g., SMS) message, as for example such a message is being processed (by for example a MICV), (2) indirectly against a message processing artifact (such as for example a MDR, CDR, etc.), after for example a message has been processed (by for example a MICV), or (3) any combination of #1 (directly) and #2 (indirectly).

Although the example, involving Mary and Joe, that was presented above employed a Peer-to-Peer (or P2P) orientation (where a peer, or MS, interacts with another peer, or MS) it will be readily apparent to one of ordinary skill in the relevant art that other orientations, including for example an Application-to-Peer (or A2P) orientation (where a peer, or MS, interacts with an application or a system), are easily possible and indeed are fully within the scope of the present invention.

In the example, involving Mary and Joe, that was presented above TNs were used as addresses. As noted previously, the instant invention is applicable to a range of communication paradigms (such as for example a VoIP data stream, software application (e.g., game, etc.) data, a SIP-addressed artifact, a video data stream (e.g., a movie, a video conference call, etc.), a voice telephone call, an audio data stream (e.g., a song, etc.), signaling and other command-and-control data, etc.) and consequently it will be readily apparent to one of ordinary skill in the relevant art that other addressing artifacts (including for example short codes, IP addresses, SIP addresses, E-Mail addresses, IM handles, etc.) are easily possible and indeed are fully within the scope of the present invention.

During various of the processing steps that were described above one or more billing transactions may optionally be completed—e.g., for various of the processing steps that are performed, for each response returned, etc. A billing transaction may take any number of forms and may involve different external entities (e.g., a WC's billing system, a carrier billing system service bureau, a credit or debit card clearinghouse, etc.). A billing transaction may include, possibly inter alia:

1) The appearance of a line item charge on the bill or statement that, for example, an entity may receive from their WC. Exemplary mechanics and logistics associated with this approach are described in for example U.S. Pat. No. 7,640,211 entitled "SYSTEM AND METHOD FOR BILLING AUGMENTATION" and its associated continuations. Other ways of completing or performing line item billing are easily implemented by those skilled in the art.

2) The charging of a credit card or the debiting of a debit card.

3) The charging of an internal account.

4) The generation of aspects of an invoice.

Various of the messages that were described above (for example and inter alia, reference numeral 1318 in FIG. 13) may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a Location-Based Service (LBS) facility).

Various of the messages that were described above (for example and inter alia, reference numeral 1318 in FIG. 13) may optionally contain advertising—e.g., textual material if a simple paradigm (such as SMS) is being utilized, or multimedia (images of brand logos, sound, video snippets, etc.) material if a more capable paradigm (such as MMS) is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS facility).

Various of the messages that were described above (for example and inter alia, reference numeral 1318 in FIG. 13) may optionally contain promotional materials (e.g., still images, video clips, etc.).

Figure 14:
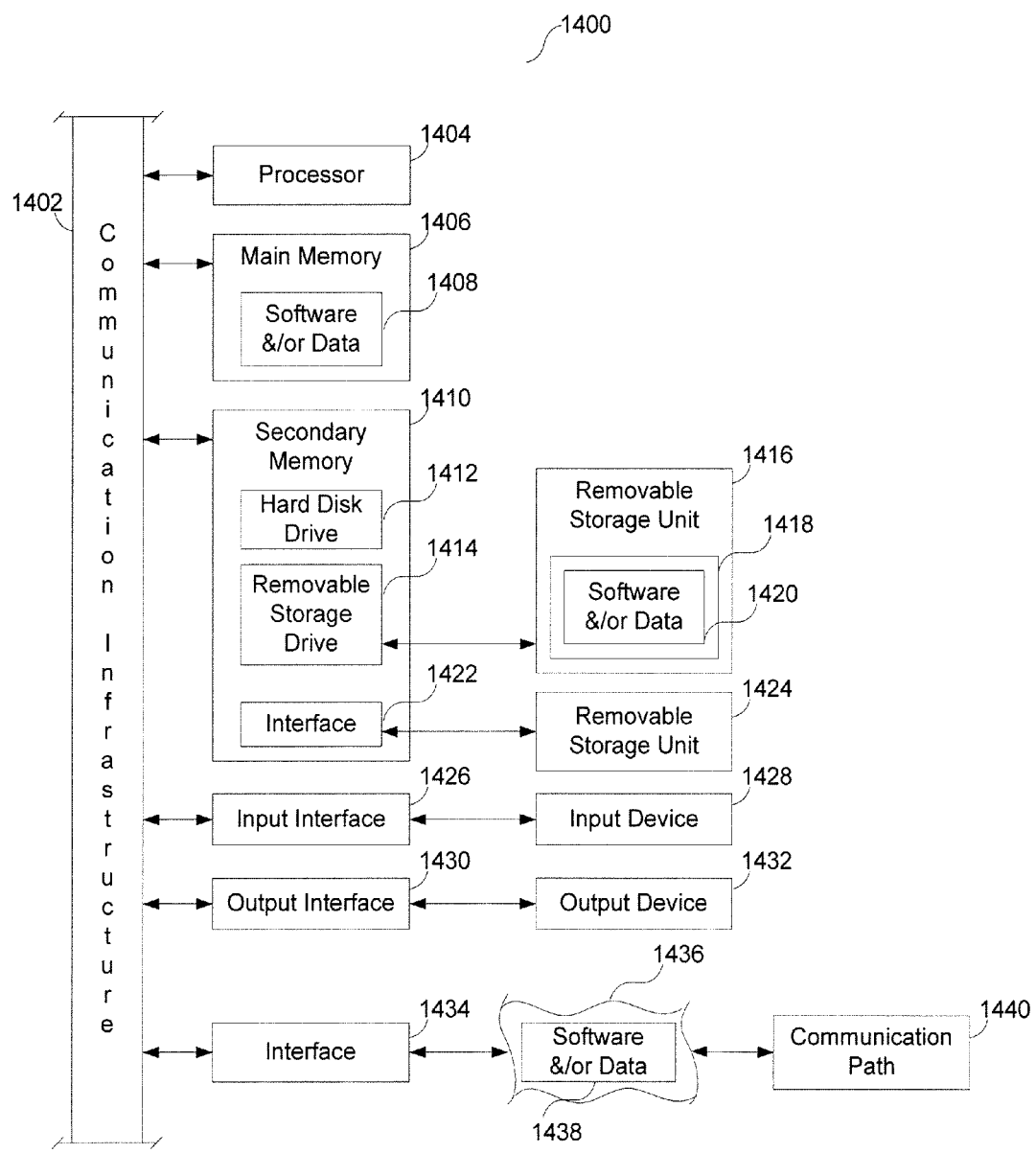
FIG. 14 depicts an exemplary computer system through which embodiments of aspects of the present invention may be implemented.

Various aspects of the present invention can be implemented by software, firmware, hardware, or any combination thereof. FIG. 14 illustrates an example computer system 1400 in which the present invention, or portions thereof, such as described above can be implemented as computer-readable code. Various embodiments of the invention are described in terms of this example computer system 1400. After reading this description, it will become apparent to a person skilled in the relevant art how to implement the invention using other computer systems and/or computer architectures.

Computer system 1400 includes one or more processors, such as processor 1404. Processor 1404 can be a special purpose processor or a general purpose processor. Processor 1404 is connected to a communication infrastructure 1402 (for example, a bus or a network).

Computer system 1400 also includes a main memory 1406, preferably Random Access Memory (RAM), containing possibly inter alia computer software and/or data 1408.

Computer system 1400 may also include a secondary memory 1410. Secondary memory 1410 may include, for example, a hard disk drive 1412, a removable storage drive 1414, a memory stick, etc. A removable storage drive 1414 may comprise a floppy disk drive, a magnetic tape drive, an optical disk drive, a flash memory, or the like. A removable storage drive 1414 reads from and/or writes to a removable storage unit 1416 in a well known manner. A removable storage unit 1416 may comprise a floppy disk, magnetic tape, optical disk, etc. which is read by and written to by removable storage drive 1414. As will be appreciated by persons skilled in the relevant art(s) removable storage unit 1416 includes a computer usable storage medium 1418 having stored therein possibly inter alia computer software and/or data 1420.

In alternative implementations, secondary memory 1410 may include other similar means for allowing computer programs or other instructions to be loaded into computer system 1400. Such means may include, for example, a removable storage unit 1424 and an interface 1422. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 1424 and interfaces 1422 which allow software and data to be transferred from the removable storage unit 1424 to computer system 1400.

Computer system 1400 may also include an input interface 1426 and a range of input devices 1428 such as, possibly inter alia, a keyboard, a mouse, etc.

Computer system 1400 may also include an output interface 1430 and a range of output devices 1432 such as, possibly inter alia, a display, one or more speakers, etc.

Computer system 1400 may also include a communications interface 1434. Communications interface 1434 allows software and/or data 1438 to be transferred between computer system 1400 and external devices. Communications interface 1434 may include a modem, a network interface (such as an Ethernet card), a communications port, a Personal Computer Memory Card International Association (PCM-CIA) slot and card, or the like. Software and/or data 1438 transferred via communications interface 1434 are in the form of signals 1436 which may be electronic, electromagnetic, optical, or other signals capable of being received by communications interface 1434. These signals 1436 are provided to communications interface 1434 via a communications path 1440. Communications path 1440 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 1416, removable storage unit 1424, and a hard disk installed in hard disk drive 1412. Signals carried over communications path 1440 can also embody the logic described herein. Computer program medium and computer usable medium can also refer to memories, such as main memory 1406 and secondary memory 1410, which can be memory semiconductors (e.g. Dynamic Random Access Memory (DRAM) elements, etc.). These computer program products are means for providing software to computer system 1400.

Computer programs (also called computer control logic) are stored in main memory 1406 and/or secondary memory 1410. Computer programs may also be received via communications interface 1434. Such computer programs, when executed, enable computer system 1400 to implement the present invention as discussed herein. In particular, the computer programs, when executed, enable processor 1404 to implement the processes of aspects of the present invention, such as the steps discussed above under paragraphs 28-138. Accordingly, such computer programs represent controllers of the computer system 1400. Where the invention is implemented using software, the software may be stored in a computer program product and loaded into computer system 1400 using removable storage drive 1414, interface 1422, hard drive 1412 or communications interface 1434.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

It is important to note that the hypothetical examples that were presented above, which were described in the narrative and which were illustrated in the accompanying figures, are exemplary only. They are not intended to be exhaustive or to limit the invention to the specific forms disclosed. It will be readily apparent to one of ordinary skill in the relevant art that numerous alternatives to the presented examples are easily possible and, indeed, are fully within the scope of the present invention.

The following list defines acronyms as used in this disclosure.

| Acronym | Meaning |
| --- | --- |
| A2P | Application-to-Peer |
| API | Application Programming Interface |
| CAN-SPAM | Controlling the Assault of Non-Solicited Pornography and Marketing |
| CDR | Call Detail Record |
| CD-ROM | Compact Disc Read-Only Memory |
| CP | Content Provider |
| CRD | Composite Routing Database |
| DBMS | Database Management System |
| DH | Data Highway |
| DPE | Data Processing Engine |
| DRAM | Dynamic Random Access Memory |
| E-Mail | Electronic Mail |
| ENUM | Electronic Numbering |
| EPROM | Erasable Programmable Read-Only Memory |
| GPRS | General Packet Radio Service |
| GRX | GPRS Roaming Exchange |
| IM | Instant Messaging |
| IMO | Internal Message Object |
| IMS | IP Multimedia Subsystem |
| IMSI | International Mobile Subscriber Identity |
| IP | Internet Protocol |
| JMS | Java Message Service |
| LBS | Location-Based Service |
| LERG | Local Exchange Routing Guide |
| MAP | Mobile Application Part |
| MDR | Message Detail Record |
| MEMS | Microelectromechanical Systems |
| MICV | Messaging Inter-Carrier Vendor |
| MMS | Multimedia Message Service |
| MMSC | Multimedia Message Service Center |
| MNP | Mobile Number Portability |
| MS | Mobile Subscriber |
| MSC | Mobile Switching Center |
| MSU | Message Signal Unit |
| ODBMS | Object Database Management System |
| P2P | Peer-to-Peer |
| PCMCIA | Personal Computer Memory Card International Association |
| PDA | Personal Digital (or Data) Assistant |
| PDU | Protocol Data Unit |
| PROM | Programmable Read-Only Memory |
| RAM | Random Access Memory |
| RDBMS | Relational Database Management System |
| RF | Radio Frequency |
| RTQF | Real-Time Query Facility |
| SC | Short Code |
| SIP | Session Initiation Protocol |
| SMPP | Short Message Peer-to-Peer |
| SMS | Short Message Service |
| SMSC | Short Message Service Center |
| SP | Service Provider |
| SS7 | Signaling System Number 7 |
| 3P | Third Party |
| TCP | Transmission Control Protocol |
| TN | Telephone Number |
| UDP | User Datagram Protocol |
| URI | Uniform Resource Identifier |
| URL | Uniform Resource Locator |
| VoIP | Voice Over IP |

| Acronym | Meaning |
|---|---|
| WAP | Wireless Application Protocol |
| WC | Wireless Carrier |
| WD | Wireless Device |

What is claimed is:

1. Within a message processing entity a computer-implemented method for detecting spam, the computer-implemented method comprising:
   receiving, at a gateway, a Short Message Service (SMS) message, the SMS message comprising an originating address and a destination address;
   processing the SMS message, including at least:
      updating, in a cache, an entry for the originating address, including at least incrementing by one a first counter in the cache entry when the destination address is unique for the originating address within a first time window representative of a first period of time,
      evaluating a value of the first counter for the cache entry;
      evaluating a value of a second counter that was operative within a second time window representative of a second period of time prior to the first period of time and incremented by one when, upon receipt of another SMS message, the destination address thereof was unique for the originating address, and
      when the value of the first counter and the value of the second counter exceed respective defined thresholds setting a spam indicator; and
   responsive to the spam indicator being set, performing one or more remediation activities including at least updating a blacklist.

2. The computer-implemented method of claim 1, wherein the cache is implemented through one or more of (a) memory storage and (b) disk storage.

3. The computer-implemented method of claim 2, wherein the implementation employs a Database Management System.

4. The computer-implemented method of claim 1, wherein the one or more remediation activities further includes one or more of (a) updating a greylist, (b) issuing an alert, and (c) dropping the SMS message.

5. Within a message processing entity a computer-implemented method for detecting spam, the computer-implemented method comprising:
   receiving, at a gateway, a Short Message Service (SMS) message;
   processing the SMS message, including at least creating a message processing artifact, the message processing artifact comprising an originating address and a destination address;
   updating, in a cache, an entry for the originating address, including at least incrementing by one a first counter in the cache entry when the destination address is unique for the originating address within a first time window representative of a first period of time; and
   accessing a second counter in the cache that was operative within a second time window representative of a second period of time prior to the first period of time and incremented by one when, upon receipt of another SMS message, the destination address thereof was unique for the originating address, and when the value of the first counter and the value of the second counter exceed respective defined thresholds, performing one or more remediation activities including at least updating a blacklist.

6. The computer-implemented method of claim 5, wherein the cache is implemented through one or more of (a) memory storage and (b) disk storage.

7. The computer-implemented method of claim 6, wherein the implementation employs a Database Management System.

8. The computer-implemented method of claim 5, wherein the accessing is performed on one or more of (a) a scheduled basis and (b) an as-needed basis.

9. The computer-implemented method of claim 5, wherein the accessing is accomplished via one or more of (a) an Application Programming Interface, (b) direct memory operations, and (c) wrapper functions.

10. The computer-implemented method of claim 5, wherein the one or more remediation activities further includes one or more of (a) updating a greylist and (b) issuing an alert.

* * * * *